USO10403022B1

(12) United States Patent
Silva et al.

(10) Patent No.: US 10,403,022 B1
(45) Date of Patent: Sep. 3, 2019

(54) RENDERING OF A VIRTUAL ENVIRONMENT

(71) Applicant: Amazon Technologies, Inc., Seattle, WA (US)

(72) Inventors: Ryan Dale Silva, Seattle, WA (US); Kevin Kalima Ashman, Seattle, WA (US); Robert Harvey Oates, III, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/705,873

(22) Filed: May 6, 2015

(51) Int. Cl.
  *G06T 15/00* (2011.01)
  *G06T 19/00* (2011.01)
  *H04L 29/06* (2006.01)

(52) U.S. Cl.
  CPC .......... *G06T 15/005* (2013.01); *G06T 19/003* (2013.01); *H04L 65/60* (2013.01); *G06T 2219/024* (2013.01)

(58) Field of Classification Search
  None
  See application file for complete search history.

(56) References Cited

U.S. PATENT DOCUMENTS

| | | | | |
|---|---|---|---|---|
| 2006/0200662 A1* | 9/2006 | Fulton | ..................... | A63F 13/12 713/164 |
| 2007/0168543 A1* | 7/2007 | Krikorian | ............ | G11B 27/034 709/231 |
| 2008/0104268 A1* | 5/2008 | Farber | ..................... | G06F 9/505 709/233 |
| 2009/0172746 A1* | 7/2009 | Aldrey | .................. | H04N 5/765 725/61 |
| 2011/0072467 A1* | 3/2011 | Lee | ..................... | H04N 21/4122 725/56 |
| 2014/0038708 A1* | 2/2014 | Davison | ................. | A63F 13/12 463/31 |
| 2016/0100215 A1* | 4/2016 | Di Bernardo | ........ | H04N 21/812 725/19 |
| 2017/0282075 A1* | 10/2017 | Michot | .................. | H04L 67/02 |

\* cited by examiner

*Primary Examiner* — Yingchun He
(74) *Attorney, Agent, or Firm* — Thorpe North & Western, LLP.

(57) ABSTRACT

Technology is described for distributing an environment event stream and rendering of video for a three dimensional (3D) virtual environment using a distributed system. A method may include receiving an environment event stream from a first computing node. The environment event stream may be used by a virtual environment engine to modify a 3D virtual environment. A destination computing node for the environment event stream may be determined using a destination address stored by a broadcast repeater. Another operation may be sending the environment event stream from the broadcast repeater to the destination computing node at the destination address. In addition, a video of an environment copy of the 3D virtual environment may be rendered as modified by the environment event stream from a perspective of a virtual camera to provide rendering of the 3D virtual environment that is distributed.

20 Claims, 9 Drawing Sheets

RENDERING OF A VIRTUAL ENVIRONMENT

BACKGROUND

In recent years, the adoption of mobile computing devices and relatively low-cost computing devices such as smartphones, tablets, laptops, and electronic book readers ("e-readers") has exposed many people to video games and virtually simulated environments (e.g., virtual worlds). This is in part due to the network-connectivity offered by these computing devices and the robust application ecosystems that supports the download of video games and other virtual reality applications to these computing devices. Video games and centralized virtual environments have become a popular past-time for many people.

Along with increased interest in engaging in video games, the demand for viewing video games while other players are engaging in the games has increased along with the demand for competitions, tournaments and other in game interactions. Just as sports may be viewed live by spectators while the games are being played, video games, video game tournaments, and video game competitions may also be viewed by spectators in a live or recorded format. Streaming video of popular players or popular teams playing video games may be streamed to viewers from the player's view point. These video gaming developments are placing increased loads on computing nodes (e.g., servers) used to render and output video that represents the virtualized environments and games.

DETAILED DESCRIPTION

Figure 1:
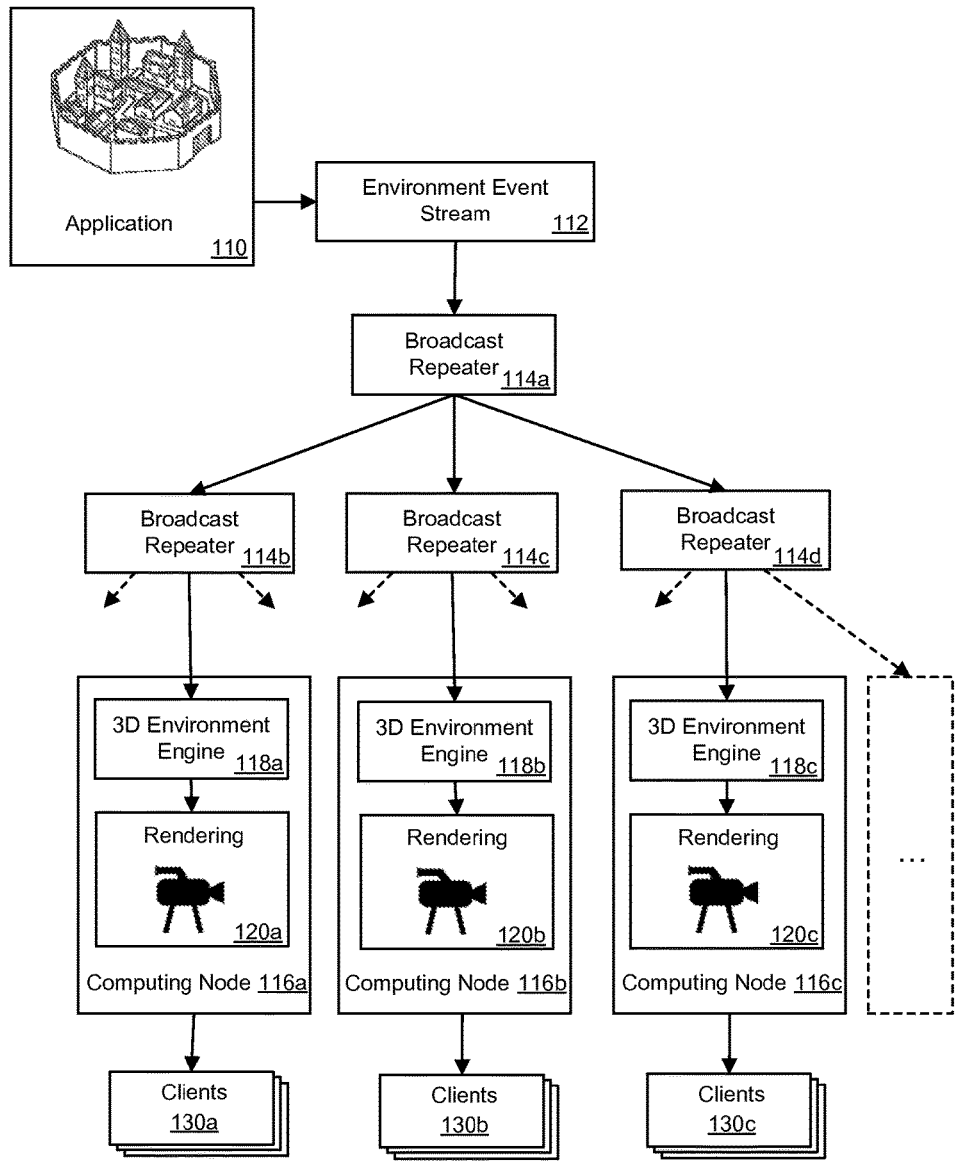
FIG. 1 is a block diagram illustrating a high level example of a distributed system for rendering of video for a three dimensional (3D) virtual environment.

A technology is disclosed for distributing an environment event stream to enable rendering of graphics from multiple virtual camera perspectives for an application, 3D environment, or 3D game using computing nodes in a distributed architecture. The application, 3D environment, or game may have a 3D virtual environment that is rendered by a computing node for viewing by a viewer via a client. The number of clients who simultaneously request computer graphics renderings for the application, 3D environment or game may be large enough that a single computing node may not be able to handle the load that rendering and transmitting video may place on the computing node. In order to deal with the viewing load created by the clients or viewers, an environment event stream for a 3D virtual environment may be distributed to a plurality of destination computing nodes or downstream computing nodes to enable rendering of the virtual environment in a distributed fashion at separate computing nodes or virtualized computing instances (e.g., virtualized computing nodes). The rendering of multiple viewpoints or virtual cameras for the 3D virtual environment in a distributed architecture may allow each computing node to render the virtual 3D virtual environment based on the environment event stream. The renderings on one computing node may be independent of renderings on any other rendering computing node and the rendered video can be supplied to multiple clients. The environment event stream may contain or represent events that: result in changes to the 3D virtual environment, transform the 3D virtual environment geometry, modify model positions or geometry based on user input, provide status events resulting from user inputs, represent the results of rules affecting the 3D virtual environment, etc. For example, when a destination computing node receives the environment event stream for a game, then a virtual environment engine may modify the 3D virtual environment using the environment event stream by moving game avatars, transforming geometric objects, launching projectiles in the game, etc.

The technology may use broadcast repeaters on the computing nodes to transmit a duplicated environment event stream in order for video of a 3D virtual environment to be rendered at each computing node, and the environment event stream may be used to modify the 3D virtual environment using a virtual environment engine. A computing node at a root of a broadcast repeater network (i.e., a root node) may use a broadcast repeater to broadcast the environment event stream to destination computing nodes downstream, which may also have one or more broadcast repeaters. These broadcast repeaters may be used to form a broadcasting structure for the environment event stream.

A view for a virtual camera in the 3D virtual environment may be rendered to form a video stream originating from the destination computing nodes that are downstream in the distributed network from the computing node at the root of the broadcast repeater network. A supplemental data overlay may be added to the distributed video streams rendered for the virtual environment at the destination computing nodes or downstream computing nodes. For example, additional 2D or 3D images or geometry, 2D or 3D video, audio or other media may be added to the video stream to create an enhanced video stream and the enhanced video stream may be forwarded to a video viewing client.

This technology may be used, for example, for streaming video of computer games and video games. With prior video game streaming systems, users or players may capture and record rendered gameplay and stream the video using video services developed especially for games, but this type of video streaming generally limits video capture to a single virtual camera position representing the player's own virtual camera. In contrast, the present technology may render a large number of independent views for multiple virtual cameras without overloading the application or gameplay on the root computing node executing the game or 3D virtual environment. Each of the virtual cameras may be associated with a different director who is controlling, directing or producing the video being generated. Directors may be individuals who are controlling cameras but are not players. The directors may be considered directors in the electronic sense of controlling a virtual camera and directing supplemental media that may be added to the video or environment event stream, but the director does not control the action in the application because that is controlled by the users of the application or players of game. By distributing the environment event stream and also the rendering load, a large number of separate viewpoints may be created by virtual cameras viewing the same 3D virtual environment from different perspectives using multiple, distributed computing nodes.

FIG. 1 illustrates an example of a technology for distributing an environment event stream 112 that is associated with an application 110 or game executing on a computing node. The computing node may be a virtualized computing instance, as will be discussed in more detail later.

A broadcast repeater 114a-d may receive the environment event stream 112 through a network port or through an electronic channel via which the broadcast repeater is listening for network communications (e.g., network packets). Alternatively, the broadcast repeater 114a may receive the environment event stream using API (application program interface) calls over a network or from the application. The broadcast repeater 114a may be configured to transmit the environment event stream 112 to another broadcast repeater 114b or a destination computing node, such as computing node 116a. The broadcast repeater 114a may send the environment event stream 112 across: a local network, a virtual network, the internet or another computer network using existing networking protocols, such as TCP/IP (transmission control protocol/internet protocol) or other networking protocols.

In a specific example, an online game computing node with an application 110 may be used that is linked to a network of broadcast repeaters 114a-d. The online game computing node with the application 110 may transmit the environment event stream 112 to the network of broadcast repeaters 114a-d. The environment event stream 112 or game event stream may be replicated at broadcast repeaters 114a-d in order to be further distributed across multiple computing nodes. The term replicated is used to refer to the duplication of the environment event stream for use on another computing node. Distribution of the environment event stream 112 may enable the game to be rendered and viewed using a large number of computing nodes in communication with the broadcast repeater 114a-d network. The broadcast repeaters 114a-d may be executing on computing nodes or network appliances.

The environment event stream 112 may be sent to computing nodes 116a-c that have 3D environment engines 118a-c for managing the 3D geometry of the 3D virtual environment. For example, the 3D environment engines 118a-c may provide model transformations, depth culling, viewing transformations, clipping, and/or other functions for the 3D virtual environment. The environment event stream 112 may be sent from a broadcast repeater 114a-d. Examples of implementing the computing nodes may be a hardware computing node or a virtualized computing node (e.g., a computing instance in a hypervisor as discussed more later).

The computing nodes 116a-c may also contain rendering engines 120a-c with virtual cameras which may be used to follow the action in the 3D virtual environment in ways no physical camera is able, and the virtual cameras may be controlled in several ways. In a first example of virtual camera control, the virtual camera may be controlled by an artificial intelligence (AI) controller with adaptive behaviors for positioning the virtual camera that change based on a machine learning method or change using programmed heuristics that are modified from time to time in the technology. Some of these AI and heuristic camera behaviors may include: a follow camera that follows particular actors in an application or game (e.g., following a lead player in a game), an overhead camera, camera positions not attached to any player but fixed to particular moving or stationary environment objects, a camera that tracks an area of a game where the most action or movement is, motion triggered cameras, a follow camera for a victory lap, a replay camera (e.g., replay a player's winning shot), cameras that react to trigger events, behaviors, or rules, and other AI cameras.

In a second example of virtual camera control, a human director may use a virtual camera monitoring utility to switch between multiple views in a 3D virtual environment for effect, just like a live sporting event. Multiple views may be generated by moving a single virtual camera through a pre-determined path in space or by switching between multiple virtual cameras located at separate locations. In one scenario, a director may have placed multiple virtual cameras at separate view points throughout a 3D virtual environment on the director's computing node. The director may then quickly switch between the virtual cameras when the application is active (e.g., a game is being played) in order to provide a good view of selected events that the director deems interesting. More specifically, the 3D environment engines 118a-c may enable a director to switch a virtual camera view. Alternatively, a game engine or application may provide the virtual camera view switching function that is received from a director and sent to the 3D environment engines 118a-c. This virtual camera control is analogous to a television director that can switch between different real camera views when televising an event.

In yet another example, spectators watching a game on a video streaming service for games may switch to different virtual camera views manually by using integrated graphical controls that may be accessible via a hosting site (e.g. links on a site) for the game or a video streaming service. The spectator may also be able to switch between different virtual camera views on the same computing node 116a or between virtual camera views across multiple computing nodes 116a-c. A spectator may also be able to view multiple virtual camera views at the same time by displaying video output in adjacent video players on screen. Further, the multiple virtual camera views may be displayed in multiple panels or windows on a client 130a graphical user interface (GUI).

The computing nodes with the broadcast repeaters 114a-d may or may not have an associated rendering module 120a-c with a virtual camera and rendering buffer. Thus, the broadcast repeaters 114a-d may be standalone repeaters on a computing node and the computing node may have one or more broadcast repeaters 114a that are located the computing node. Even though a computing node may have a broadcast repeater and rendering module, the broadcast repeater may not necessarily always be used if the computing node is a leaf node that is used for rendering and not for repeating the environment event stream.

The output from the rendering engines 120a-c may provide a video stream that may be sent to multiple clients 130a-c to enable viewing of the video streams at the multiple clients 130a-c. The video may be two-dimensional (2D) video at any resolution or the video may be stereoscopic 3D video where the image is split into left and right images and specialized projection hardware and/or eye wear is used to create the illusion of depth for a viewer. The video streams may be sent out at a rate of 24, 30, 60, 120 frames or more per second where the rendering engine 130a-c supports such frame rates. This technology may be used in rendering video for games such as electronic sports games, shooter games, action games, and any other games types that use a 3D virtual environment or similar environment that uses graphical rendering technology. The technology may also be used for rendering video for virtual meetings, virtual collaborative 3D modeling sessions, simulations, other business purposes, etc.

While rendering has been described here, the present technology may use ray-tracing instead of rendering. The ray tracing to obtain the desired video output may also be performed in a distributed architecture, as described. In one scenario, the ray tracing may be implemented using ray tracing operations performed directly on computing nodes that are hardware based with special ray tracing acceleration hardware. The ray tracing may also be implemented on a computing instance if enough computing speed is available. An example of a computing instance type may be specialized graphics or computational computing instance.

Figure 2:
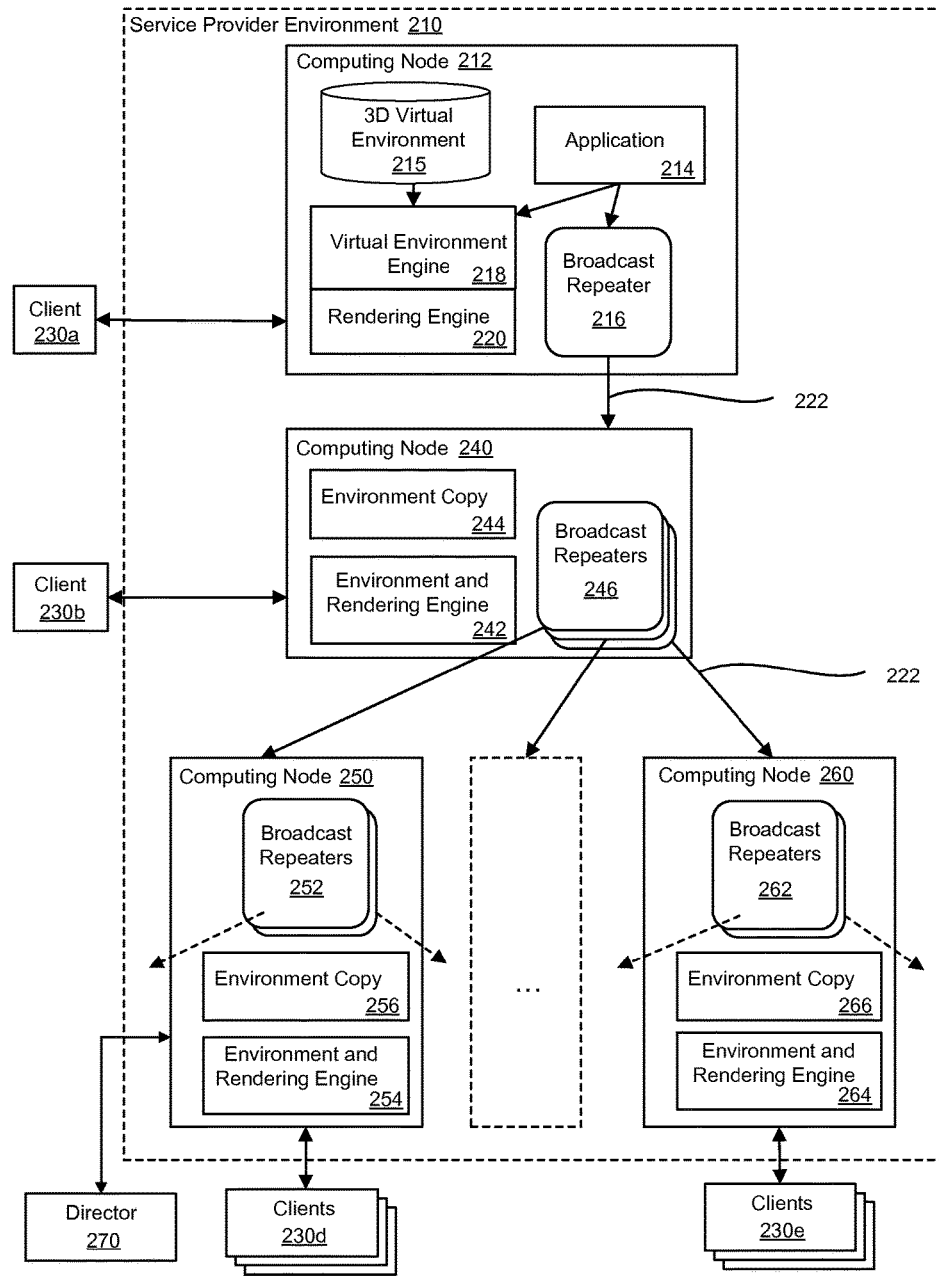
FIG. 2 is a block diagram illustrating an example of a distributed system for rendering of video in a service provider environment.

FIG. 2 illustrates a system for distributing of an environment event stream to enable rendering of video for a three dimensional (3D) virtual environment using a distributed system. The system may be provided on an underlying service provider environment 210 that supplies virtualized computing services to customers. An application 214 may be executing on a computing node 212, and the computing node 212 may be a computing unit (e.g., a processor or processing unit), a physical hardware server, or a virtualized server as will be discussed in more detail later (e.g., a computing instance). The application 214 may be a 3D simulation, a game, a multi-user 3D environment, a 3D computer animated environment, a 3D geographical map environment, or another 3D environment.

The computing nodes 212, 240, 250, 260 may be computing instances or computing resources available as a service in a service provider environment 210. Computing services provided through the service provider environment 210 may enable access to a hardware substrate that is underlying the computing resources. Some example computing services available over a computer network may include compute services, storage services, networking services, I/O services, and so forth. For example, a computing instance may be executing on a hypervisor, which in turn executes on a hardware substrate that is physical hardware.

As used herein "virtual computing" may refer to the use of computing services (hardware and/or software) which may be available at a remote location that is separate from the users of the computing services and the virtual computing services may be accessible over a network, such as the Internet. Users may be able to buy these computing services (including storage, computing power, networking and applications) as a utility on demand and sometimes by the hour. Use of virtual computing services may provide a number of advantages including scalability, cost advantages and/or the ability to adapt rapidly to changing computing service needs.

The service provider environment 210 may be a multi-tenant service provider environment 210, such as a "cloud" environment for example. The service provider environment 210 may include an execution environment or a computing instance that includes an application software stack for the user's application(s) together with one or more infrastructure services for executing the user's application on the compute service. The virtualization environment or computing instance may include a user-selectable operating system (e.g., Linux, Windows, etc.), application server, etc. The virtualization environment may be configured to be accessed at a specific URL. The infrastructure services may include, but are not limited to, a load balancer to distribute workload across the requested computing services, a load scaling service to scale computing services in response to load or demand variations, a firewall or other service to control access to the computing services, a monitoring interface that permits the user to monitor execution of applications, data storage resources (e.g., scalable, volume block storage), and so forth. In some embodiments, the user may be able to select one or more services that may be accessed in the virtualization infrastructure. For example, the user may be able to select from a plurality of database models (e.g., a relational database, SQL database, NoSQL database, Oracle database, etc.). In some embodiments, the infrastructure services may be customized to the user rather than being a shared resource among a plurality of users. For example, in some such embodiments, the load balancer may be individually customized to the user's application rather than being shared or distributed among a number of users of the computing service provider.

The service provider environment 210 may be capable of delivery of computing and storage capacity, as well as other computing services, as a service to a community of end recipients. In an example implementation, the service provider environment 210 may be established for an organization (i.e., a "customer") by or on behalf of the organization. That is, the service provider may offer a "virtual private cloud environment."

In one example, the service provider environment 210 may include any number of computing nodes or computing instances for a compute service. The computing nodes (e.g., servers) may provide computing services for executing software or computing instances, which may also be referred to as virtual machines or computing instances. A virtual machine may generally be an instance of a software implementation of a machine (i.e. a computer) that executes computer code like a physical machine.

In FIG. 2, an environment event stream related to the application 214 may be composed of events including external inputs to a first virtual environment engine 218. The external inputs may be game control instructions, user interface input, live audio and other external inputs for the application 214 or game. The environment event stream may be used by the first virtual environment engine 218 to modify a 3D virtual environment 215 received from a data store on a first computing node 212. The 3D virtual environment 215 may include the 3D models, textures, maps, and even rules for generating a 3D virtual environment. Further, the computing nodes may be servers that are hardware servers or virtualized servers (e.g., computing instances) as discussed earlier.

The virtual environment engine 218 may be a geometry engine that manages operations such as model movement, depth culling, viewing transformation and/or clipping. Alternatively, the virtual environment engine 218 may be an enhanced geometry engine that assists the application with collision detections, gameplay management, and other game or 3D environment aspects. The computing node 212 may have a rendering engine 220 that renders frames of the 3D virtual environment 215 to a frame buffer to provide video that may be sent to a client 230*a*. The client 230*a* may also provide input to the application for game or 3D virtual environment being interacted with. For example, the input for a game may include keyboard presses, mouse clicks, touch events, voice recognition and other control inputs that result in: moving game characters, moving game vehicles, taking a game action (e.g. shooting or jumping), menu navigation, throttle control, interacting with other characters in a game, and other game inputs.

The environment event stream 222 from an application 214 may be transmitted from a broadcast repeater 216 on a first computing node 212 to a second computing node 240. The environment event stream may be replicated at the second computing node 240. One or more of the replicated environment event streams 222 may be transmitted to destination computing nodes 250, 260 that are "downstream" from the second computing node 240 using a plurality of broadcast repeaters 246. These additional computing nodes 250, 260 may further replicate and transmit the environment event stream to other computing nodes and broadcast repeaters until a leaf computing node in the tree is reached (e.g., a leaf in the hierarchical organization of computing nodes that have broadcast repeaters and/or renderers). While FIG. 2 illustrates the application 214 being located solely on a computing node 212, the application 214 may be divided over multiple computing nodes and/or clients, or the application 214 may reside independently on the service computing environment 210.

An environment copy 244 of the 3D virtual environment may be modified using the environment event stream and a second virtual environment engine in the environment and rendering engine 242 on the second computing node 240. The environment copy 244 may be a copy of the 3D virtual environment that is located on another node. The computing node 212, which may have one or more computing processors and memory in order to execute the modification of the environment copy 244 and execute the graphics pipeline for the application 214 (e.g., game).

In situations where more computing nodes are needed, one or more similar or even identically configured computing nodes may be launched within the service provider environment 210. The service provider environment 210 may employ a scaling service that monitors the total processor usage for each computing node in the broadcast repeater tree or chain. For example, if 100 clients are currently receiving streaming video from the distributed rendering system at a rate of 10 clients per computing node but another 20 clients connect, then 2 more computing nodes may be added to the network of broadcast repeaters to cover the load. Specifically, if the processor usage exceeds a pre-defined threshold, then the monitoring service may launch additional virtualized computing nodes that contain an environment copy, an environment and rendering engine and an additional group of broadcast repeaters. The newly launched computing node(s) may be located at the same level in a network structure (e.g., the tree) as the overloaded computing node or the new computing node(s) may become a new sub-portion of the network structure (e.g., tree).

Video may be rendered of the environment copy 244 as modified by the environment event stream from a perspective of a virtual camera in the environment copy 244 using the rendering engine 242 on the second computing node 240. The video may be transmitted to a client 230*b* that has a video player application in a browser or an independent video client to present the video to a viewer. In one configuration, the client 230*b* may host a video recorder application to record the video being generated. The video may also be recorded at the computing node 240 in a data store and then be exported for later use. Each video output from the computing nodes may be sent to one or more clients (e.g., 1 to 100 clients) as processing power and networking bandwidth allow. At a certain threshold, the existing services will be overloaded and new computing nodes may be launched to help service the growing demand.

The use of separate environment copies 256, 266 and separate environment and rendering engines 254, 264 on multiple computing nodes 250, 260 enables the rendering of video for the environment copies 256, 266 to be rendered from different perspectives on the computing nodes 250, 260. These varying perspectives may be produced using virtual cameras on downstream computing nodes 240, 250, 260 with perspectives that are different from a first virtual camera on the first computing node 212 or root computing node. The perspective of the virtual cameras (e.g., view from the virtual camera defined as a position in 3D space and a viewing direction) may be controlled and modified using input from a director 270 or camera person. Alternatively, the virtual camera perspective may be fixed or controlled by artificial intelligence (AI). These multiple perspectives are also available without putting a significant load onto the first computing node 212 or root computing node because the rendering of the other virtual cameras is offloaded to other computing nodes. The first computing node 212 may be able to render a few views for the players (e.g., 2 to 50 players) that are on the first computing node 212, but the broadcasting of the environment event stream 222 enables the scaling of the rendering while also provided rendering of a virtually unlimited number of viewpoints. These computing nodes 250 and 260 may also contain an environment copy 256, 266, an environment and rendering engine 254, 264, and broadcast repeaters 252, 262 and send rendered video to clients 230*d-e*.

While rendering using a distributed system has been described as sending out environment event streams in a tree format. Other networked configurations may be used. For example, the broadcast repeaters 252, 262 may be organized in a chain, in a star network configuration, a combination of a star network and a tree, a ring network, a mesh network, a line network, a fully connected network, a bus network, or any other useful network configuration.

In another configuration, a comparatively large 3D virtual environment may not be able to be hosted by a single computing node 212. The 3D virtual environment may then be split over multiple originating computing nodes or multiple computing nodes at the root of the tree or other network configuration. In the case of a game execution, each segment of the 3D virtual world on separate computing nodes may be replicated to a separate group of downstream computing nodes 250, 260.

Figure 3:
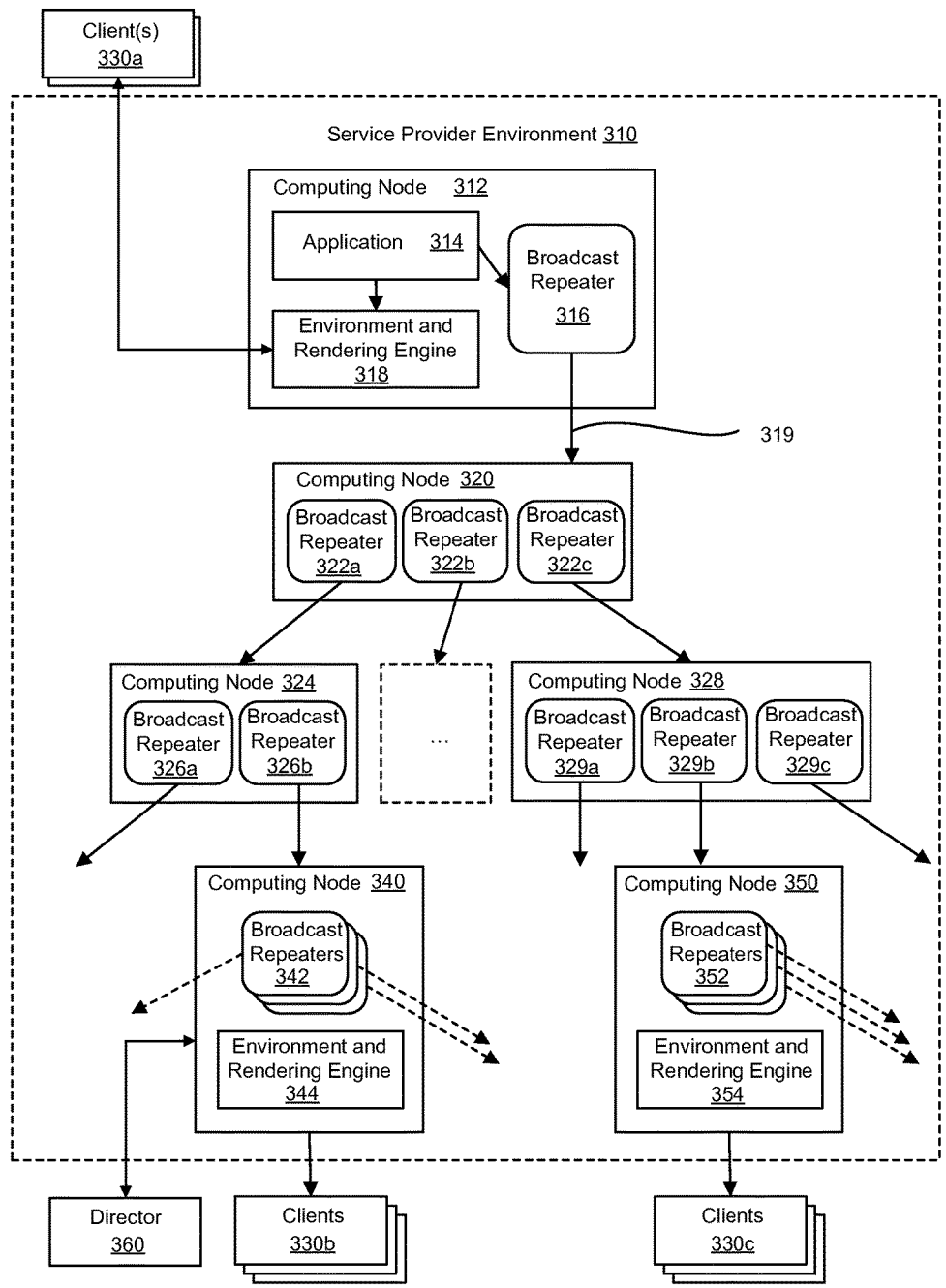
FIG. 3 is a block diagram illustrating an example of a distributed system for rendering of video in a service provider environment where specific computing nodes contain broadcast repeaters without maintaining a copy environment.

FIG. 3 illustrates an example system for distributing of an environment event stream and rendering of a 3D virtual environment using a distributed system. In contrast to FIG. 2, FIG. 3 illustrates that the computing nodes 320, 324, 328 through which the environment event stream is replicated and transmitted may contain broadcast repeaters alone and may not contain an environment copy, or environment and rendering engine.

In one example implementation, the computing nodes 312, 320, 324, 328, 340, 350 may be hosted within a service provider environment 310. A computing node 312 may act as the root computing node (i.e., first computing node or main computing node) and host an application 314. In one example, the application 314 may be a 3D game environment where multiple players may connect to the game using client(s) 330*a* and the players may compete or collaborate in the application 314. The environment event stream, as described earlier, may be sent from the application 314 to the environment and rendering engine 318 and rendered video of the game may be sent to the client(s) 330*a*. In an alternative configuration, each player in a game or user of a 3D virtual environment may render the video at the player's own client to reduce the load on the computing node.

The environment event stream may also be sent to a broadcast repeater 316. The environment event stream may contain game events such as geometry movements (e.g., movement of geometric models), non-player character actions, player actions, game status, and other game events. The broadcast repeater 316 may send the environment event stream to a second computing node 320 and the environment event stream may be replicated at the second computing node 320. Accordingly, the environment event stream may be replicated for each of the broadcast repeaters 322*a-c*. The replicated environment event streams may then be transmitted by a plurality of broadcast repeaters 322*a-c* to other destination computing nodes 324, 328.

The second computing node 320 may send the replicated environment event stream to another tier of computing nodes 324, 328 downstream, which may again replicate the environment event stream and send the environment event stream to additional computing nodes 340, 350. This may mean that the environment event stream is sent to destination computing nodes 324, 328 that have a plurality of broadcast repeaters 326*a-b*, 329*a-c*. The environment event stream may be sent to computing nodes 324, 328 that contain only broadcast repeaters 326*a-b*, 329*a-c* or the environment event stream may be sent directly to computing nodes 340, 350 that are computing nodes which contain rendering capabilities. Rendering capabilities may exist at every computing node in the tree or only at leaf computing nodes of the tree or networking structure. The computing nodes 340, 350 may further transmit the environment event stream to a plurality of destination computing nodes using each of the broadcast repeaters 342, 352 to replicate the environment event stream.

The network structure of broadcast repeaters 316, 322*a-c*, 326*a-c*, 329*a-c*, 342 and 352 may be of any depth or width. Thus, any number of broadcast repeaters may be contained in a computing node. There may be one broadcast repeater up to a large number of broadcast repeaters (e.g., 1 to 1,000 or more) depending on the power of the computing node. As an example of a tree with at least four tiers, FIG. 3, illustrates sending the environment event stream 319 from the first computing node 312 to a second computing node 320 that has a plurality of broadcast repeaters. The broadcast repeaters 322*a-c* enable a plurality of third tier computing nodes 324, 328 to receive the environment event stream and further repeat the environment event stream to a fourth tier of computing nodes 340, 350.

The broadcast repeaters may be turned on or off in a computing node as needed to scale the overall output of the system. For example, when a downstream computing node (e.g., computing node 324) drops the connection with a broadcast repeater (e.g., broadcast repeater 322*a*), then the broadcast repeater may be turned off until the broadcast repeater is needed again. If a new computing node or destination computing node is launched to connect to the computing node 320, then the broadcast repeater 322*a* may be connected to the new computing node. As more clients 330*a-c* are added to view the rendered video output, then more computing nodes with broadcast repeaters may be launched and more broadcast repeaters within existing computing nodes may be turned on until a processing power limit is reached for each computing node.

Some computing nodes in the broadcast network containing the broadcast repeaters may contain a copy environment (not shown in this figure for simplification purposes) to which the environment event stream may be applied. Accordingly, the copy environment may be modified using the environment event stream, and the copy environment may be rendered using an environment and rendering engine 344, 354 to produce video that may be output to clients 330*b-c*. For instance, the clients may include a playback viewer (e.g., a browser with a video plugin or separate video player) to enable live viewing of a video feed for a game that is streamed across the internet. Alternatively, some clients may record the video for later playback of game play. Other clients may send the completed video out to a content delivery network (CDN) for distribution through the CDN network. Some leaf computing nodes may only contain a copy environment and the graphics pipeline 344, 354 and may not contain a broadcast repeater. Accordingly, computing nodes 312, 320, 324, 328, 340, 350 may be configured with or without a broadcast repeater 322*a-c*, a copy environment (not shown in this figure) and/or an environment and rendering engine 344, 354 depending the configuration desired at that computing node.

In some configurations, the broadcast repeater 316 in the first computing node 312 may act as a "master" broadcast repeater and monitor the computing and networking loads of the other broadcast repeaters. The broadcast repeater 316 that is acting as a master may then launch computing nodes with broadcast repeaters and refer clients to other broadcast repeaters with available processing power when processing power is not available on the master broadcast repeater or other downstream broadcast repeaters. Many of the computing nodes 340, 350 depicted may have different viewpoints or multiple virtual cameras controlled by separate directors 360 (e.g., virtual camera technicians or virtual camera persons) that are rendered and are of interest to a user or viewer. Clients 330*b-c* may connect directly to computing nodes 340, 350 by using a URL (uniform resource locator) link, a URI (uniform resource identifier), an IP (internet protocol) address or indirectly via a graphical interface from a computing node accessed via a browser that directs clients 330*b-c* to the desired computing node 340, 350.

Figure 4:
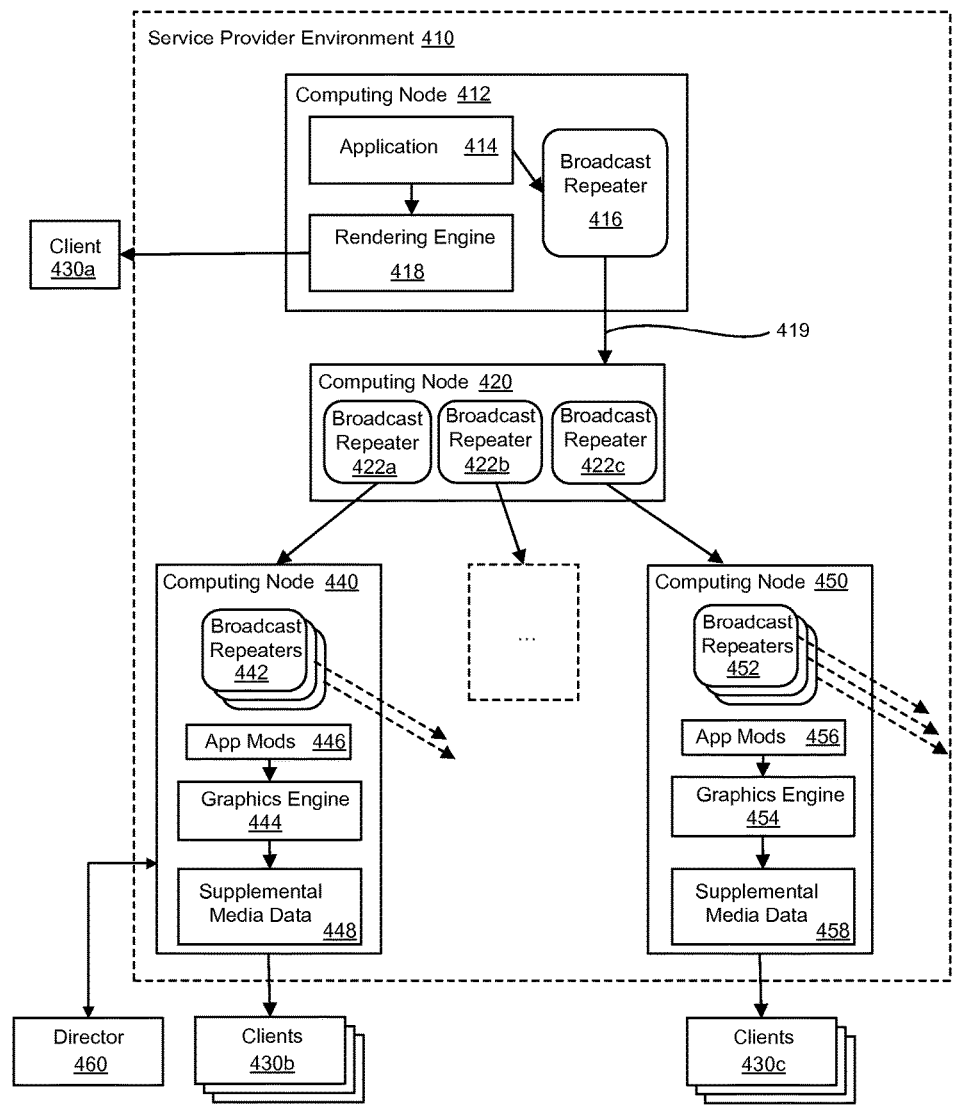
FIG. 4 is a block diagram illustrating an example of a distributed system for rendering of video and for incorporating supplemental media data into the video.

FIG. 4 illustrates an example system for distributing an environment event stream and rendering of a 3D virtual environment using a distributed system, along with adding supplemental media information to a rendered video stream at a computing node. The computing power for providing the rendering may be provided by a service provider environment 410. The elements in the computing node 412 at the root of a broadcast network, including the application 414, rendering engine 418, broadcast repeater 416, client 430*a*, are similar to the elements discussed in FIG. 3 and earlier. Further, the computing node 420 and broadcast repeaters 416, 422*a-c*, 442, 452 are also similar in function and structure to the elements described in FIG. 3.

FIG. 4 illustrates a system for enabling the addition of supplemental media data 448, 458 to the video rendered from the 3D virtual environment as modified by the environment event stream 419 to form an enhanced video stream at a computing node 440, using one or more processors. The supplemental media data 448, 458 may be a two dimensional (2D) graphical overlay, a three dimensional (3D) graphical overlay, audio overlay, live video overlay, or rendered video overlay. A director 460 or producer may control what is added as a part of the supplemental media data. Examples of what may be added may include: audio commentary for a game, a 2D static overlay showing graphics and text from a secondary source to indicate a name of a person or group controlling the virtual camera on that computing node, etc. A 3D animated overlay may show a new character that appears in the environment copy that is being viewed from an interesting perspective by a director 460 controlling a virtual camera (but the character or director does not appear in the parent 3D virtual environment). In one example, a director 460 may insert a rendered animal overlay (e.g., a 3D animated dog or chicken) onto the video that may acts as director's mark or calling card.

In another example, special effects, annotations, text and other material may be added to the video. When viewers see the video feed from that individual director 460, the viewers may be able to recognize the artwork and style of the director 460. A director 460 may be the person who controls the virtual camera location in the 3D virtual world, or the director 460 may instruct another person or camera person to control the location of the virtual camera. In one configuration, the original 3D virtual environment from which the environment event stream is being broadcasted may have a Chroma key area or green screen area that is rendered into the original broadcast of the environment event stream for the 3D virtual environment, and then a director who is downstream may add material into the area that has been specifically Chroma keyed for the additional of supplemental material. This enhanced video stream may be streamed to a plurality of clients 430*b-c* from the computing nodes 440, 450 where the supplemental media data is being added.

Another way that the video stream may be modified at a computing node 440, 450 or another downstream computing node is by applying application modifications (mods) 446, 456 to the copy environment used by the graphics engine 444, 454. In one example, different graphical textures may be applied to the graphics engine 444 which may result in a change in the way a game looks even though the game play (physics, game rules, player actions, etc.) may remain the same. For example, the graphics engine for a 3D shooter game may be changed from a modern military theme to a western theme or a science fiction theme.

Modifications may also be made to the game play engine. For instance, modifications may be made that include changing: sounds, lighting parameters, physics responses (e.g., adding particle effects), results in response to gameplay, etc. While it is possible to make modifications to the video output at the computing node 412 at the root of the tree, the addition of modifications are more likely to be made a computing nodes 440, 450 that are downstream from the root of the tree than at an originating computing node 412.

In another configuration, additional events may be added as supplemental event data and the expanded version of the supplemental event data may be repeated along with the original environment event stream by the broadcast repeaters 442, 452 to downstream computing nodes or destination computing nodes. For example, a modified app engine may capture the supplemental events created by the person controlling the camera (e.g., a director). So, the existence of the director may be passed on to the next destination computing node and a viewer of the rendered video of the copy environment further downstream may also see the director controlling the camera in the downstream copy environment. However, a rendering of the original 3D virtual environment will not see that director. In addition, any virtual changes to the environment made by the director may be seen just by that director or any downstream computing nodes that are rendering that environment using the modified environment event stream.

A delay event feature may also be incorporated into the playback of the video. A director may delay a video output stream for some amount of time (e.g., 15 seconds to 90 seconds) to enable the selection of a camera at a different position or the addition of a camera at a specific location in anticipation of an interesting event that is known to occur, which the director has already seen on the live or near real-time video output. Clients who receive the delayed output may receive an improved viewing experience, and if the clients and users are not viewing any other feed or video stream of the same event or 3D virtual environment, then the small delay may be unnoticeable.

Figure 5:
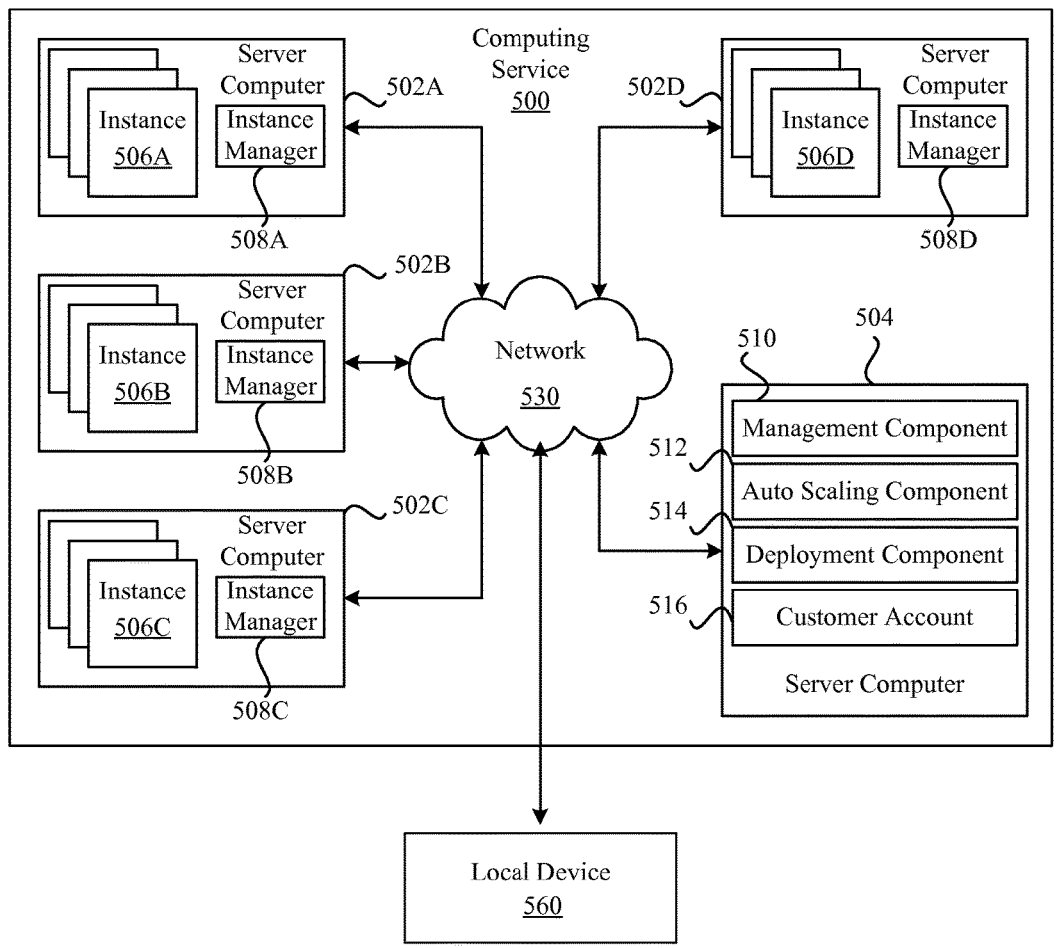
FIG. 5 is a schematic block diagram overview of a virtual computing service provider in accordance with an example of the present technology.

FIG. 5 illustrates how components of a data center may function as a computing service 500 in a service provider environment. As discussed earlier, the computing service 500 (i.e., the cloud provider or service provider) may be capable of delivery of computing and storage capacity as a service to a community of end recipients. In an example implementation, the computing service may be established for an organization by or on behalf of the organization. That is, the computing service 500 may offer a "private cloud environment." In another implementation, the computing service 500 may support a multi-tenant environment, wherein a plurality of customers operate independently (i.e., a public cloud environment). Generally speaking, the computing service 500 may provide the following models: Infrastructure as a Service ("IaaS"), Platform as a Service ("PaaS"), and/or Software as a Service ("SaaS"). Other models may also be provided. In some implementations, end users access the computing service 500 using networked client devices or local devices 560, such as desktop computers, laptops, tablets, smartphones, etc running web browsers or other lightweight client applications. Those skilled in the art will recognize that the computing service 500 may be described as a "cloud" environment.

The particularly illustrated computing service 500 may include a plurality of server computers 502A-502D. While four server computers are shown, any number may be used, and large centers may include thousands of server computers. The server computers 502A-502D may provide computing resources for executing software instances 306A-306D. In one implementation, the instances 506A-506D may be virtual machines. A virtual machine may be an instance of a software implementation of a machine (i.e. a computer) that executes applications like a physical machine. The instances 506A-D may be able to provide the processing for the computing instances doing the rendering and containing the broadcast repeaters, as described earlier. In the example of virtual machine, each of the servers 502A-502D may be configured to execute an instance manager 508 capable of executing the instances. The instance manager 508 may be a hypervisor or another type of program configured to enable the execution of multiple instances 506 on a single server. Additionally, each of the instances 506 may be configured to execute one or more applications.

It may be appreciated that although the implementations disclosed herein are described primarily in the context of virtual machines, other types of instances may be utilized with the concepts and technologies disclosed herein. For instance, the technologies disclosed herein may be utilized with storage resources, data communications resources, and with other types of computing resources. The implementations disclosed herein might also execute all or a portion of an application directly on a computer system without utilizing virtual computing instances.

One or more server computers 504 may be reserved for executing software components for managing the operation of the server computers 502 and the instances 506. For example, the server computer 504 may execute a management component 510. A customer may access the management component 510 to configure various aspects of the operation of the instances 506 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 512 may scale the instances 506 vertically or horizontally based upon rules defined by the customer. In one implementation, the auto scaling component 512 allows a customer to specify scale-up policies for use in determining when new instances may be instantiated, including what type of instance to instantiate, and scale-down policies for use in determining when existing instances may be terminated. The auto scaling component 512 may consist of a number of subcomponents executing on different server computers 502 or other computing devices. The auto scaling component 512 may monitor available computing resources over an internal management network and modify resources available based on predictions of need as well as based on actual need.

A deployment component 514 may be used to assist customers in the deployment of new instances 506 of computing resources. The deployment component 514 may have access to account information associated with the instances, such as who is the owner of the account, credit card information, country of the owner, etc. The deployment component 514 may receive a configuration from a customer that includes data describing how new instances 506 may be configured. For example, the configuration may specify one or more applications to be installed in new instances 506, provide scripts and/or other types of code to be executed for configuring new instances 506, provide cache logic specifying how an application cache may be prepared, and other types of information. The deployment component 514 may utilize the customer-provided configuration and cache logic to configure, prime, and launch new instances 506. The configuration, cache logic, and other information may be specified by a customer using the management component 510 or by providing this information directly to the deployment component 514.

Customer account information 516 may include any desired information associated with a customer of the multi-tenant environment. For example, the customer account information may include a unique identifier for a customer, a customer address, billing information, licensing information, customization parameters for launching instances, scheduling information, auto-scaling parameters, previous IP addresses used to access the account, etc. Information such as the unique identifier, IP addresses used to access the account and so forth may be used in authenticating a user to the service provider environment.

A network 530 may be utilized to interconnect the server computers 502A-502D and the server computer 504. The network 530 may be a local area network (LAN) and may be connected to a Wide Area Network (WAN) so that end users may access the computing service 500. It may be appreciated that the network topology illustrated in FIG. 5 has been simplified and that many more networks and networking devices may be utilized to interconnect the various computing systems disclosed herein.

Figure 6:
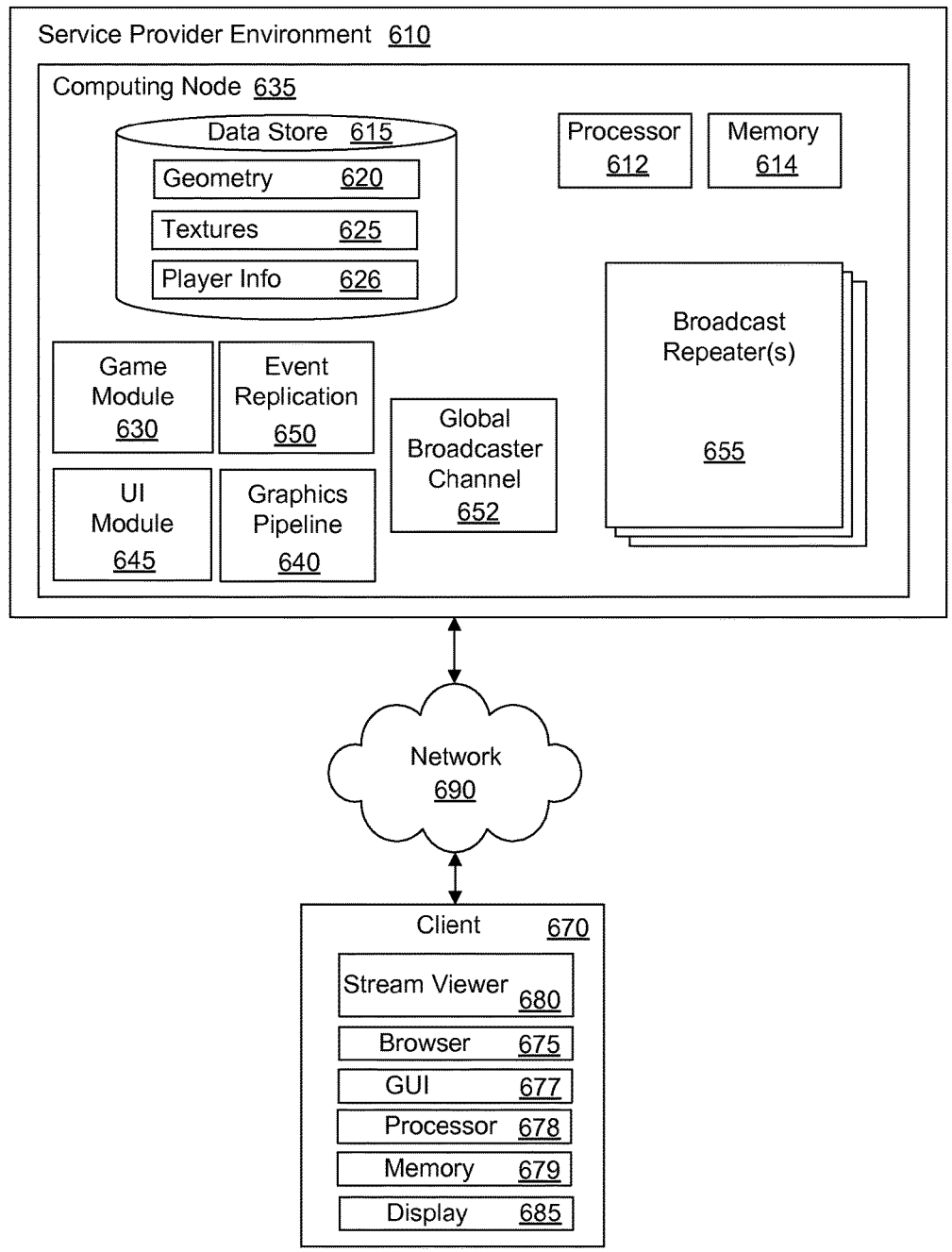
FIG. 6 is block diagram illustrating an example of a computing instance with functionality for use in rendering of video of a 3D virtual environment on computing nodes in a distributed system.

FIG. 6 illustrates a more detailed view of a single computing node 635 that is executing in a service provider environment 610 and depicts example components for the computing node 635 to enable distribution of an environment event stream and to perform distributed rendering. For example, a data store 615 may include geometry data 620 for the 3D virtual environment and textures 625 associated with that environment. The data store may optionally contain player information 626, player preferences, and other game related information.

A game module 630 or application may be provided in the computing node 635. If the computing node 635 is a root computing instance, the environment event data or gaming event data may be collected as game players play the game, and the environment event data may be used to modify the 3D virtual environment. In addition, the environment event data may be transmitted to other computing nodes via broadcast repeaters 655 in the computing instance. If the computing instance is a branch or leaf computing node then the computing instance will receive environment event data from an upstream computing node and modify a copy environment using the environment event data. An event replication module 650 may be used to replicate the environment event data for downstream computing nodes and provide the environment event data to broadcast repeaters 655 to be sent across a network 690.

A graphics pipeline 640 may be included to transform a copy environment of the 3D virtual environment using the environment event data and to render the copy environment of the 3D virtual environment from a virtual camera perspective selected by a director of the computing instance. Further, a user interface (UI) module 645 may be used to receive input from a director who is controlling the movement of the virtual camera within the copy environment. The director controlling the virtual camera within the copy environment or the director of the virtual camera may be considered a virtual director and the virtual camera may be moved anywhere the director desires during the play of a game or other exploration of a 3D virtual environment. For example, the virtual camera may be a fly on the wall perspective, an overhead perspective, a sideline perspective in a sports game, a follow camera perspective, group perspective, boom perspective, fish eye perspective, or other perspective.

A global broadcaster channel 652 may also be included in each computing node 635 in the network or broadcast repeaters 655. The global broadcaster channel 652 may enable directors to globally publish communication content that may be made available on a plurality of other computing nodes 635 and to clients 670 accessing the network of broadcast repeaters 655. In another configuration, a chat window may be provided for viewers of the modified video as modified by the environment event stream and the viewers may be able chat about the modified video and this chat stream may be limited to the modified video at the computing node. In a further configuration, the chat stream from the viewers of the modified video and environment event stream can be sent upstream to the computing node at the root of the tree or another computing node and be combined with chat related to one or more original or modified video streams. In an alternative configuration, upstream chat may be passed downstream and be combined with the chat for the modified video but the chat stream from the computing node(s) with modified video streams may not be passed up to other computing nodes.

As an example chat user interface, a window may be provided in a stream viewer 680 that is embedded into the video stream and shows text messages sent by a director to every computing node 635 that is part of the broadcast repeater network. This may allow directors to send texts, postings, links, still images or other communications to all the viewers of the application, game or simulation. Alternatively, the view window, panel or pane for the global broadcaster channel may be separate from the video being sent but the viewing control or plugin may be located in a view panel that is associated with the application and is viewable at the same time as video from the application being viewed by clients 670. In yet another configuration, two separate chat windows may be provided and one window may display all the chat stream that is passed up and/or down the entire broadcast repeater network, and another window may display entirely local chat or chat that is limited to being passed down to child computing nodes (i.e., a chat window that accumulates or inherits more chat input as the computing node is further downstream in the broadcast repeater network).

Computing services offered by a service provider environment 610, may include a virtual computing device that executes as one or more computing nodes or computing instances. An administrative user may operate one or more computing nodes to execute an operating system and computing applications as a service, and the administrative user may create, launch, and terminate computing nodes 635. The administrative user may have some control over the geographical location of computing nodes or clusters of computing nodes to optimize latency and provide high levels of redundancy.

The administrative user may access and manage the one or more computing nodes over a network 690 connection, such as a connection through the Internet, for example. The administrative user may perform various operations on the computing nodes such as adding, updating, modifying, deleting or other otherwise maintaining software or services on the computing nodes. These operations may be performed by the administrative user from the client device 670.

The computing node(s) 635 may be a virtual computing instance as previously explained, and the virtual computing instance may be implemented using a virtualization computing environment in a service provider environment 610, which may include a virtual distributed computing system with a virtualization layer executing on a hardware substrate layer. The hardware layer may include a plurality of physical computers or physical servers. The virtualization layer (e.g., hypervisor) may provide a platform on which virtualized computing instances for computing nodes 635 may be created. In other words, the virtualized computing instances for computing nodes 635 may execute on the hardware layer by using the platform provided by the virtualization layer. This computing service architecture that supports computing instances is illustrated in more detail in FIG. 5.

As discussed, the system may include one or more data stores 615. The term "data store" used herein may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

Client devices 670 may receive video or a video stream from a computing instance or computing node 635 in a computing service provider environment 610 or one or more computing instances or clusters, over a network 690. Example client devices 670 may include, but are not limited to, a desktop computer, a laptop, a tablet, a mobile device, a television, a cell phone, a smart phone, a hand held messaging device, a personal data assistant, an electronic book reader, or any device with a display 685 that may receive and present the message content.

The system may be implemented across one or more computing device(s) connected via a network 690. For example, a computing device may include a data store and various engines and/or modules as those described above and such modules may be executable by a processor of the computing device. The system may be implemented as a plurality of computing nodes or computing instances, each of which comprises at least one virtualized processor 612 and a virtualized memory 614, where the computing nodes are configured to collectively implement the modules, data stores and so forth.

The services and modules that have been described may be stored on, accessed by, accessed through, or executed by a computing device. The computing device may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the computing device according to various implementations, which applications and/or functionality may be represented at least in part by the modules that have been described. Also, various data may be stored in a data store that is accessible to the computing device. The data store may be representative of a plurality of data stores as may be appreciated. The data stored in the data store, for example, may be associated with the operation of the various modules, applications and/or functional entities described. The components executed on the computing device may include the modules described, as well as various other applications, services, processes, systems, engines or functionality not discussed in detail herein.

The client device 670 shown in FIG. 6 may be representative of a plurality of client devices that may be coupled to the network 690. The client device(s) 670 may communicate with the computing instance or computing node 635 over any appropriate network, including an intranet, the Internet, a cellular network, a local area network (LAN), a wide area network (WAN), a wireless data network or a similar network or combination of networks.

The client device 670 may include a display 685 for displaying a graphical user interface 677. The display 685 may comprise, for example, one or more devices such as cathode ray tubes (CRTs), liquid crystal display (LCD) screens, gas plasma based flat panel displays, LCD projectors, or other types of display devices, etc. The client device 670 may comprise one or more memory modules 679 and/or processors 678.

The client device 670 may be configured to execute various applications such as a browser 675, video stream viewer 680, and a respective page or content access application. The browser 675 may be executed in a client device 670, for example, to access and render content pages, such as web pages or other network content served up by the computing node 635 and/or other servers. The content access application may be executed to obtain and render for display content features from the server or computing device, or other services and/or local storage media.

In some implementations, the content access application may correspond to code that is executed in the browser 675 or plug-ins to the browser 675. In other implementations, the content access application may correspond to a standalone application, such as a mobile application. The client device 670 may be configured to execute applications beyond those mentioned above, such as, for example, mobile applications, email applications, instant message applications and/or other applications. Users at client devices 670 may access content features through content display devices or through content access applications executed in the client devices 670.

The network 690 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

Although a specific structure may be described herein that defines server-side roles and client-side roles, it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules.

Figure 7:
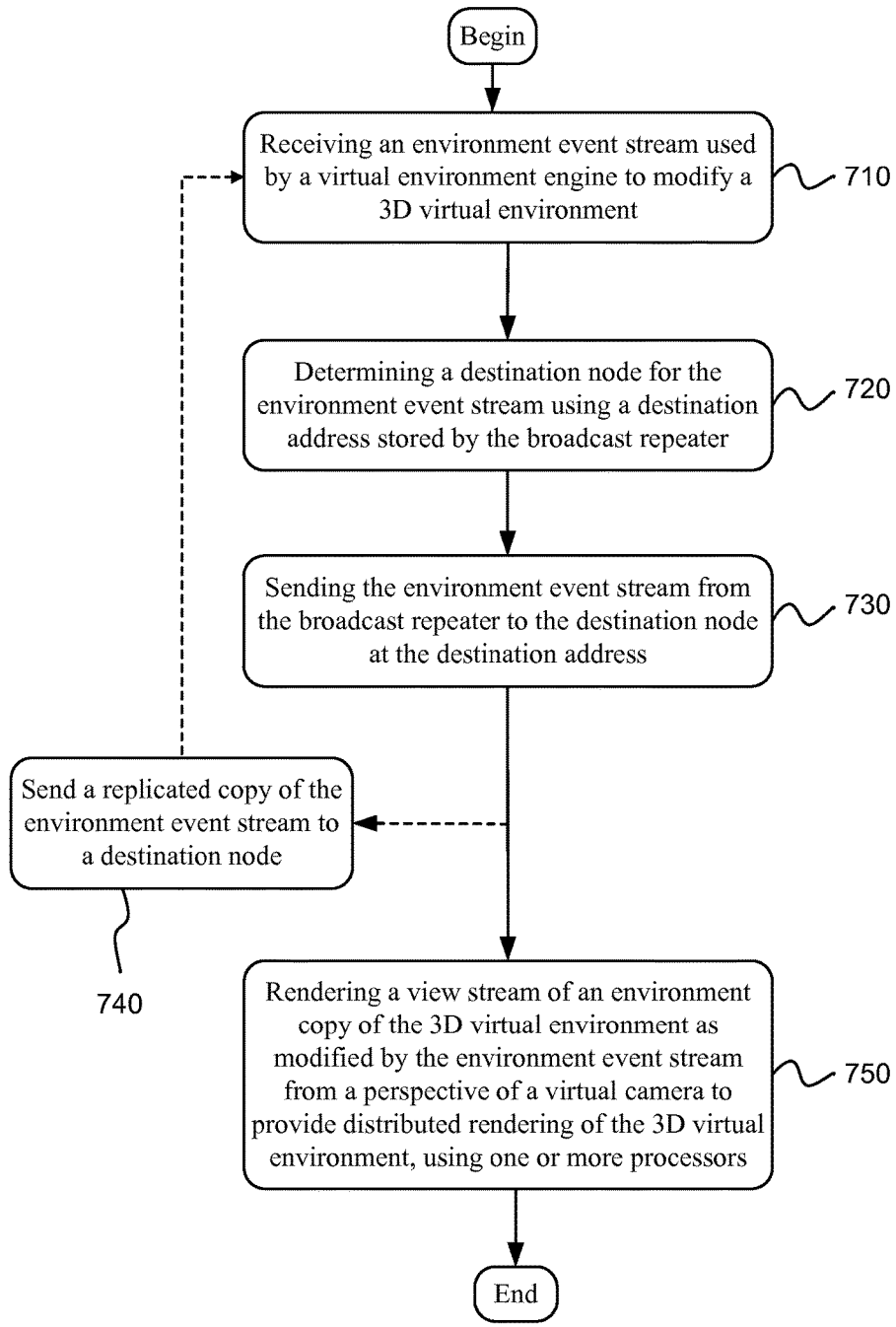
FIG. 7 is a flow chart illustrating a method for rendering of video for a 3D virtual environment in accordance with an example of the present technology.

FIG. 7 is a method describing a computing node that receives an environment event stream and uses a broadcast repeater to replicate (e.g., repeat or forward) the environment event stream to a downstream computing node. The method may include the operation of receiving an environment event stream from a first computing node where the environment event stream is used by a virtual environment engine to modify a 3D virtual environment, as in block 710. A destination computing node for the environment event stream may be determined by using a destination address stored by the broadcast repeater, as in block 720.

The environment event stream may be sent from the broadcast repeater to the destination computing node at the destination address, as in block 730. If the destination computing node (e.g., server or computing instance) contains a broadcast repeater then a replicated copy of the environment event stream may be sent to yet another destination computing node that is downstream from the initial destination computing node, as in block 740. In addition, video may be generated for an environment copy of the 3D virtual environment as modified by the environment event stream and the video may be rendered from a perspective of a virtual camera to provide rendering of the 3D virtual environment, as in block 750.

As discussed earlier, the virtual camera perspective(s) of each rendering engine on each computing node that are replicating the environment event stream may be rendered from a different perspective compared to other virtual cameras and/or computing nodes. A director may use camera controls to move the camera in three axes and dynamically move the camera. The environment event stream may be applied to an environment copy of the 3D virtual environment using a virtual environment engine on the destination computing node. The video from the environment copy modified by the environment event stream may be rendered from a perspective of a virtual camera in the virtual environment engine as defined by a director controlling the virtual camera.

Figure 8:
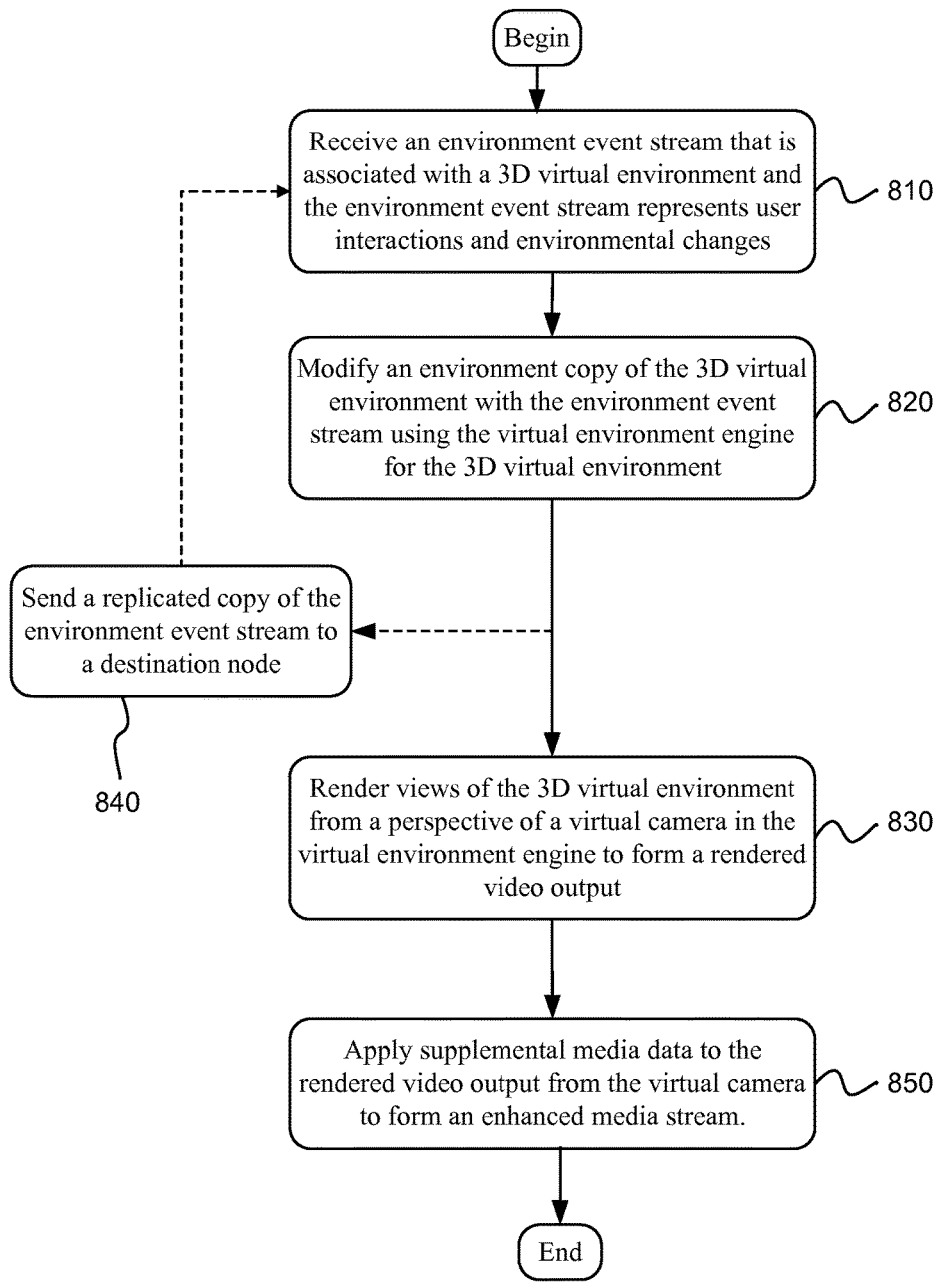
FIG. 8 is a flow chart illustrating a method for rendering of video for a 3D virtual environment with supplemental media data applied to the video output in accordance with an example of the present technology.

FIG. 8 illustrates a method and operations for a device that is an enhancement computing node with a broadcast repeater which may add media content or additional material to rendered video initially provided based on the environment event stream. The method may enable the rendering of video for a three dimensional (3D) virtual environment using a distributed system.

The method may include the operation of receiving an environment event stream that is associated with a 3D virtual environment and the environment event stream represents user interactions and environmental changes, as in block 810. The environment event stream may be related to changes for the 3D virtual environment and the changes may be made by a virtual environment engine. Then a copy environment of the 3D virtual environment may be modified by using the environment event stream to change the 3D virtual environment using the virtual environment engine, as in block 820.

Views of the 3D virtual environment may be rendered from a perspective of a virtual camera in the virtual environment engine to form a rendered video output, as in block 830. As also discussed in FIG. 7, a replicated copy of the environment event stream or data may be sent to a destination computing node, as in block 840. Whether a replication copy of the environment event stream is sent may depend on whether or not a broadcast node is active or not.

Supplemental media data may also be added to the rendered video output from the virtual camera to form an enhanced media stream, as in block 850. Adding supplemental media data to the video may form an enhanced media stream or video, which may be transmitted to a plurality of clients. As discussed earlier, the supplemental media data may be a two dimensional (2D) graphical overlay, a three dimensional (3D) graphical overlay, audio overlay, live video overlay, or rendered video overlay. In one example case, the video from the first computing node may be sent to a plurality of clients.

In one example configuration, the environment event stream may be received from a game computing node that contains the virtual environment engine, and the virtual environment engine may be configured to process a graphics rendering pipeline for the 3D virtual environment. The rendered video for the game may be rendered from a different virtual camera perspective for each environment copy of the 3D virtual environment, and the perspective of the virtual camera in the environment copy may also be independent of a perspective of a virtual camera in the 3D virtual environment.

Figure 9:
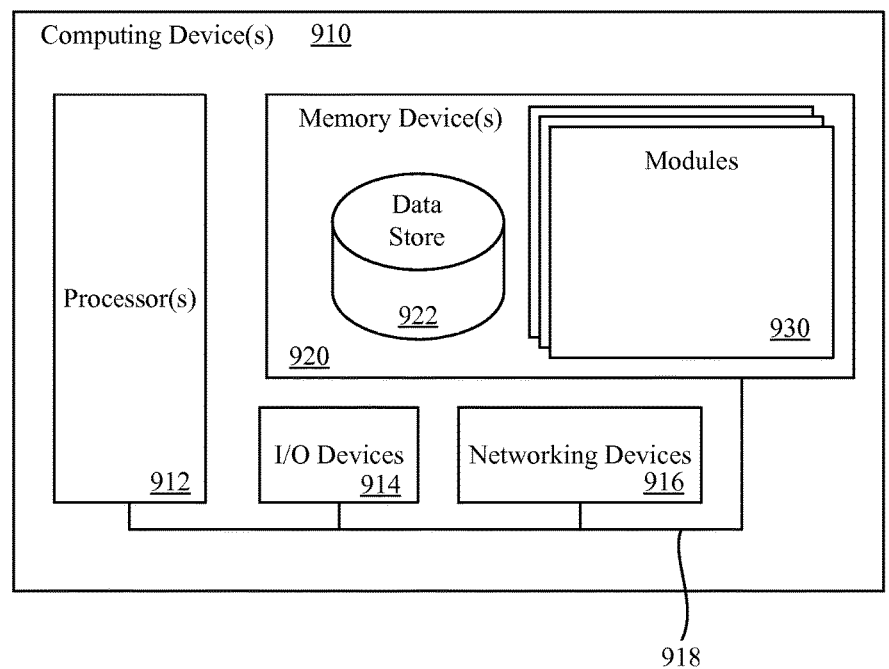
FIG. 9 is a block diagram of a computing system for use in rendering of video in accordance with an example of the present technology.

FIG. 9 illustrates a computing device 910 on which services or modules of this technology may execute. A computing device 910 is illustrated on which a high level example of the technology may be executed. The computing device 910 may include one or more processors 912 that are in communication with memory devices 920. The computing device 910 may include a local communication interface 918 for the components in the computing device. For example, the local communication interface 918 may be a local data bus and/or any related address or control busses as may be desired.

The memory device 920 may contain modules 930 that are executable by the processor(s) and data for the modules. A data store 922 may also be located in the memory device 920 for storing data related to the modules and other applications along with an operating system that is executable by the processor(s) 912.

The computing device 910 may further include or be in communication with a client device, which may include a display device. The client device may be available for an administrator to use in interfacing with the computing device 910, such as to review operation of a virtual computing instance, make improvements to machine learning models and so forth.

Various applications may be stored in the memory device 920 and may be executable by the processor(s) 912. Components or modules discussed in this description that may be implemented in the form of software using high programming level languages that are compiled, interpreted or executed using a hybrid of the methods.

The computing device 910 may also have access to I/O (input/output) devices 914 that are usable by the computing devices. An example of an I/O device 914 is a display screen that is available to display output from the computing devices. Other known I/O device may be used with the computing device as desired. Networking devices 916 and similar communication devices may be included in the computing device 910. The networking devices 916 may be wired or wireless networking devices 916 that connect to the internet, a LAN, WAN, or other computing network.

The components or modules that are shown as being stored in the memory device 920 may be executed by the processor 912. The term "executable" may mean a program file that is in a form that may be executed by a processor 912. For example, a program in a higher level language may be compiled into machine code in a format that may be loaded into a random access portion of the memory device 920 and executed by the processor 912, or source code may be loaded by another executable program and interpreted to generate instructions in a random access portion of the memory to be executed by a processor 912. The executable program may be stored in any portion or component of the memory device 920. For example, the memory device 920 may be random access memory (RAM), read only memory (ROM), flash memory, a solid state drive, memory card, a hard drive, optical disk, floppy disk, magnetic tape, or any other memory components.

The processor 912 may represent multiple processors and the memory 920 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method, comprising:
    identifying an environment event stream, wherein the environment event stream is used by a first virtual environment engine to modify a three dimensional (3D) virtual environment being executed on a first computing node, and the environment event stream includes external inputs from a first user interacting with the 3D virtual environment;
    receiving a copy of the environment event stream at a second computing node;
    modifying a copy of the 3D virtual environment using the copy of the environment event stream on a second virtual environment engine at the second computing node;
    rendering a video of the modified copy of the 3D virtual environment from a perspective of a virtual camera that is independent from virtual perspectives of the first user at the first computing node, wherein the video is rendered using a processor of the second computing node in a distributed architecture to offload rendering of the 3D virtual environment from the first computing node, and the perspective of the virtual camera is affected by a second user and the second user does not control action in the 3D virtual environment; and
    adding supplemental media data to the video based at least in part on input from the second user.

2. The method as in claim 1, wherein the 3D virtual environment is a 3D game.

3. The method as in claim 1, further comprising streaming the video and the supplemental media data to a plurality of clients.

4. The method as in claim 1, further comprising adding the supplemental media data to the copy of the environment event stream modified by the one or more visual perspectives directed by the second user at the second computing node to generate an enhanced video.

5. The method as in claim 1, wherein the supplemental media data is at least one of: a two dimensional (2D) graphical overlay, a three dimensional (3D) graphical overlay, audio overlay, live video overlay, or rendered video overlay.

6. A method, comprising:
    receiving a copy of an environment event stream at a second computing node from a first computing node, where the environment event stream is used by a virtual environment engine to modify a 3D virtual environment being performed on the first computing node, wherein the environment event stream includes external inputs received from a first user at the first computing node representing interactions with the 3D virtual environment, using one or more processors;
    rendering a video by modifying the copy of the environment event stream from a perspective of a virtual camera to provide rendering of the 3D virtual environment wherein the perspective of the virtual camera is independent from virtual perspectives of the first user at the first computing node, wherein the video is rendered using a processor of the second computing node in a distributed architecture to offload rendering of the 3D virtual environment from the first computing node, wherein the perspective of the virtual camera is directed by a second user using a destination computing node and the second user is not a player in the 3D virtual environment; and
    adding a supplemental media data overlay to the video to enhance the video, wherein the supplemental media data overlay is controlled by the second user.

7. The method as in claim 6, further comprising:
    rendering a video of the environment copy modified by the environment event stream from a perspective of a second virtual camera in a second virtual environment engine.

8. The method as in claim 6, wherein the video is combined with supplemental media data overlay to form an enhanced media stream.

9. The method as in claim 8, further comprising sending the enhanced media stream from the first computing node to a plurality of clients.

10. The method as in claim 8, further wherein the supplemental media data is at least one of: a two dimensional (2D) graphical overlay, a three dimensional (3D) graphical overlay, audio overlay, live video overlay, or rendered video overlay.

11. The method as in claim 6, wherein the destination computing node has one or more broadcast repeaters, the method further comprising:
    replicating the environment event stream at each of the broadcast repeaters; and
    transmitting the environment event stream to a plurality of destination computing nodes using each of the broadcast repeaters to transmit a copy of the environment event stream.

12. The method as in claim 11, further comprising:
    publishing communication content from a director to upstream computing nodes for a global broadcaster channel; and
    displaying the communication content to clients accessing upstream computing nodes.

13. The method as in claim 6, wherein environment event stream represents changes to the 3D virtual environment, events resulting from user inputs, or rules affecting the 3D virtual environment.

14. The method as in claim 6, wherein a broadcast repeater is configured to transmit the environment event stream to another broadcast repeater or a destination computing node.

15. The method as in claim 6, further comprising:
adding supplemental event data to the environment event stream; and
transmitting a modified environment event stream based on the supplemental event data to a destination computing node.

16. The method as in claim 6, further comprising receiving the environment event stream from a game computing node that contains the virtual environment engine, the virtual environment engine being configured to process the 3D virtual environment.

17. The method as in claim 6, further comprising enabling switching between multiple virtual camera perspectives in the 3D virtual environment.

18. A computing device, comprising:
a processor;
a memory in electronic communication with the processor;
instructions stored in the memory, the instructions being executable by the processor to:
receive a copy of an environment event stream that is associated with a 3D virtual environment and the environment event stream includes external inputs received from a first user at a first computing node representing interactions with the 3D virtual environment managed by a virtual environment engine;
modify a copy of the 3D virtual environment on a second computing node using the copy of the environment event stream and the virtual environment engine for the environment copy;
render views of the environment copy from a perspective of a virtual camera in the virtual environment engine to form a rendered video output which are independent from virtual perspectives of the first user at the first computing node, wherein the views are rendered using a processor of the second computing node in a distributed architecture to offload rendering of the 3D virtual environment from the first computing node, wherein the perspective of the virtual camera is directed by a second user using the second computing node and the second user is not a player in the 3D virtual environment; and
add supplemental media data to the rendered video output from the virtual camera to form an enhanced media stream, wherein the supplemental media data is controlled by the second user.

19. The computing device of claim 18, further comprising adding supplemental media data to the video output that is at least one of: a two dimensional (2D) graphical overlay, a three dimensional (3D) graphical overlay, audio overlay, live video overlay, or rendered video overlay.

20. The computing device of claim 18, further comprising transmitting the enhanced media stream to a plurality of clients.

* * * * *